United States Patent [19]

Brooks

[11] 4,281,785

[45] Aug. 4, 1981

[54] STAPLING APPARATUS AND METHOD AND THERMOPLASTIC STABLES USED THEREWITH

[75] Inventor: Alden W. Brooks, Springfield, Mo.

[73] Assignee: Dayco Corporation, Dayton, Ohio

[21] Appl. No.: 106,411

[22] Filed: Dec. 21, 1979

[51] Int. Cl.³ .......................... B25C 5/02; F16B 15/00
[52] U.S. Cl. .................................. 227/120; 29/432.1;
227/155; 227/156; 156/92; 156/311; 156/498;
411/471
[58] Field of Search .......................... 29/432.1; 85/49;
156/91, 92, 93, 311, 498; 227/120, 154, 155, 156

[56] References Cited

U.S. PATENT DOCUMENTS

| 2,935,434 | 5/1960 | Dawson | 227/156 X |
| 3,347,730 | 10/1967 | Keller et al. | 227/156 X |

FOREIGN PATENT DOCUMENTS

| 2017298 | 10/1970 | Fed. Rep. of Germany | 156/498 |
| 2420477 | 11/1974 | Fed. Rep. of Germany | 156/498 |

Primary Examiner—Paul A. Bell
Attorney, Agent, or Firm—Charles E. Bricker

[57] ABSTRACT

A stapling apparatus and method together with thermoplastic staples used therewith are disclosed and each staple is made entirely of thermoplastic material and has a bight and a pair of legs the outer portions of which are permanently heat shaped in clinched relation followed by immediate cooling.

4 Claims, 5 Drawing Figures

U.S. Patent
Aug. 4, 1981
4,281,785
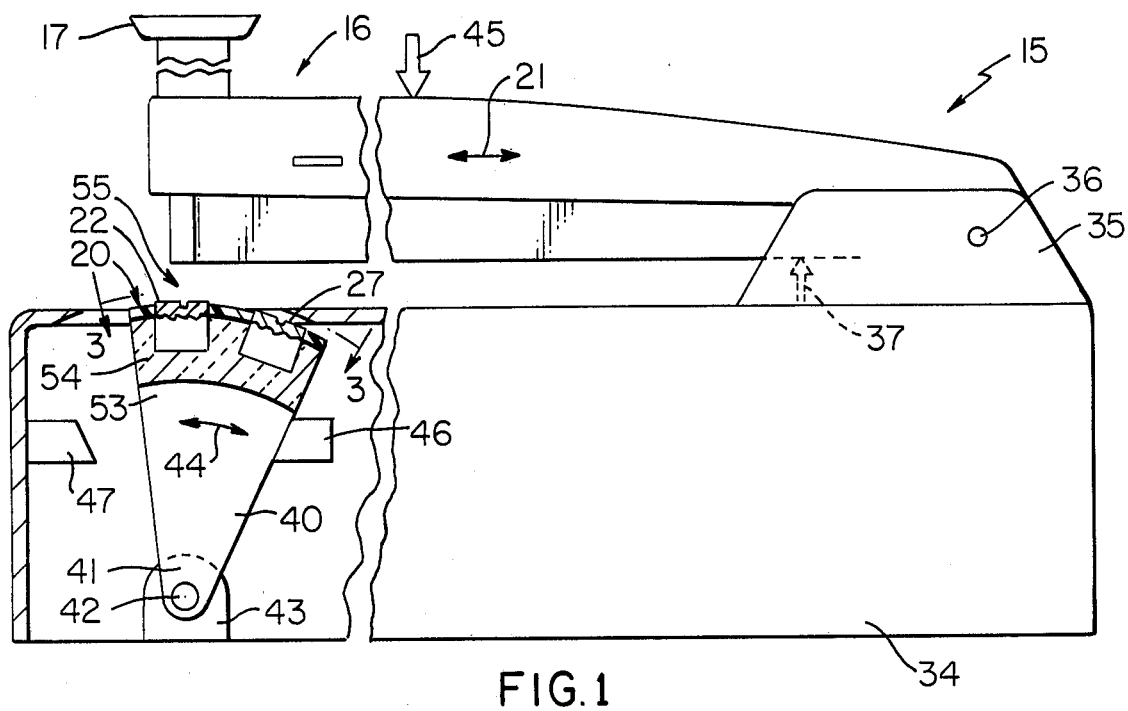
FIG.1
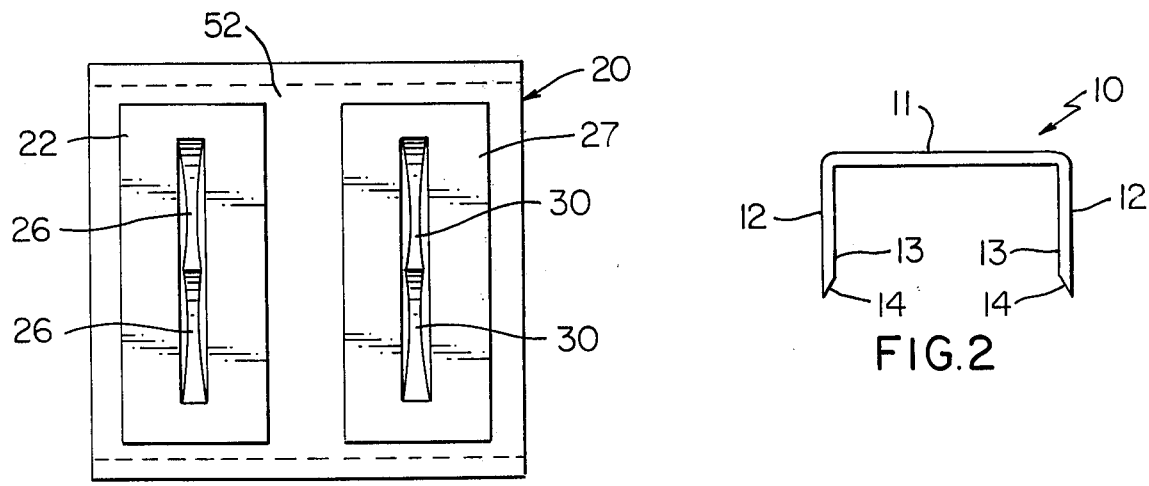
FIG. 3
FIG.2
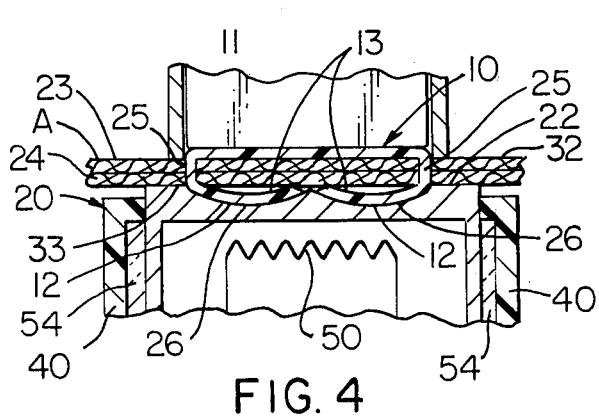
FIG. 4
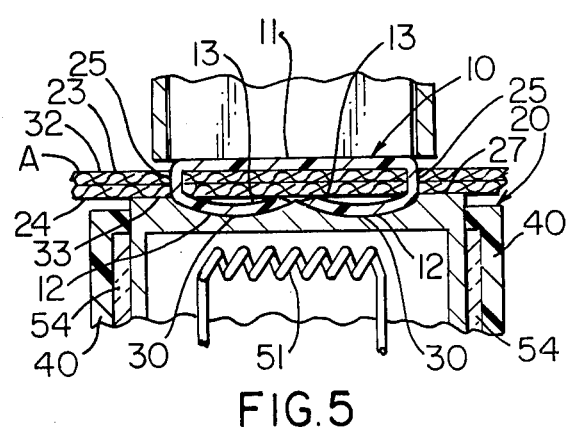
FIG. 5

STAPLING APPARATUS AND METHOD AND THERMOPLASTIC STABLES USED THEREWITH

BACKGROUND OF THE INVENTION

1. Field of the Invention

This invention relates to a stapling apparatus and method and to thermoplastic staples used therewith.

2. Prior Art Statement

It is known in the art to provide apparatus for and method of stapling utilizing metal staples.

It is also known to provide a staple consisting of a metal core and a thermoplastic covering material bonded against such core as disclosed in U.S. Pat. No. 3,076,373. Further, it has also been proposed to provide a nail, hook, staple, or the like, made of so-called vulcanite and as disclosed in U.S. Pat. No. 617,064. It is presumed from the disclosure in this latter patent that vulcanite is a hard rubber.

However, there are applications in industry and commerce where it would be desirable to employ staples made entirely of non-metallic thermoplastic material. For example, in the art of making polymeric endless power transmission belts it is common practice to fasten together (employing suitable fasteners) a plurality of webs of sheet material, such as fabric, and then coat the resulting construction on one or both sides with a polymeric material. The coating action may be by calendering, skim coating, frictioning, knife coating, or the like technique. The coated construction is then used in building a belt-defining sleeve which is subsequently cut after curing and cooling thereof to define a plurality of endless power transmission belts. It is desirable that the fasteners employed to fasten the fabric be made of a material which may be readily cut without damage to the cutting device; and, it has been found that staples made of a thermoplastic material have numerous advantages in this type of application.

SUMMARY

It is a feature of this invention to provide a stapling apparatus particularly adapted to be used employing staples made entirely of thermoplastic material.

Another feature of this invention is to provide a stapling apparatus for stapling an assembly of components wherein the apparatus has a stapling head for carrying and serially dispensing a plurality of staples with each of the staples comprising a bight and a pair of legs extending in substantially parallel relation from opposite ends of the bight, staple driving means in the head for driving each of the staples through the assembly once each staple is dispensed into a driving position, and a clinching anvil for clinching outer portions of the legs of each staple, wherein the stapling head is particularly adapted to carry and dispense staples made entirely of thermoplastic material and the anvil has a heated portion for heating and shaping the outer portions of the legs in clinched relation after disposal of the legs through the assembly.

Another feature of this invention is to provide a stapling apparatus of the character mentioned in which the heated portion of the anvil has an integral heater disposed therein.

Another feature of this invention is to provide a stapling apparatus of the character mentioned in which the anvil has a cooled portion for cooling the outer portions of the legs after heat shaping thereof.

Another feature of this invention is to provide a stapling apparatus of the character mentioned in which the cooled portion has an integral cooling device disposed therein.

Another feature of this invention is to provide an improved method of stapling an assembly of components utilizing a staple made entirely of thermoplastic material.

Another feature of this invention is to provide a method of stapling an assembly of components comprising the steps of, providing a staple made of a thermoplastic material with the staple having a bight and a pair of legs extending in parallel relation from opposite ends of the bight, disposing the bight against one side of the assembly with the legs extending therethrough, and permanently shaping outer portions of the legs in clinched relation against a side of the assembly opposite from the one side wherein the permanently shaping step comprises heating the outer portions of the legs to provide heat shaped outer portions and the heat shaped outer portions retain their permanent form upon cooling thereof.

Another feature of this invention is to provide a method of the character mentioned and comprising the further step of cooling the outer portions with a cooling device.

Another feature of this invention is to provide an improved staple made entirely of a thermoplastic material and adapted to be used with an apparatus and method of the character described.

Therefore, it is an object of this invention to provide an improved stapling apparatus, improved stapling method, and improved thermoplastic staple adapted to be used with such apparatus and method, having one or more of the novel features set forth above or hereinafter shown or described.

Other details, features, uses, objects, and advantages of this invention will become apparent from embodiments thereof presented in the following specification, claims, and drawing.

BRIEF DESCRIPTION OF THE DRAWING

The accompanying drawing shows present preferred embodiments of this invention, in which FIG. 1 is a view primarily in elevation with parts in cross-section, parts broken away, and parts shown schematically particularly illustrating one exemplary embodiment of the apparatus and method of this invention;

FIG. 2 is a view in elevation of an exemplary staple which may be used with the apparatus and method of FIG. 1;

FIG. 3 is an enlarged view taken essentially on the line 3—3 of FIG. 1;

FIG. 4 is an enlarged fragmentary primarily cross-sectional view of the staple driving means and anvil of the apparatus of FIG. 1 being utilized to staple an assembly of components, shown as a pair of fabric layers, and illustrating a heating device provided as an integral part of the anvil; and FIG. 5 is a view similar to FIG. 3 illustrating the utilization of a cooling device which is also provided as an integral part of the anvil of the apparatus of FIG. 1.

DETAILED DESCRIPTION

Reference is now made to FIG. 2 of the drawing which illustrates one exemplary embodiment of a staple which is particularly adapted for use with the apparatus and method of this invention and such staple is designated generally by the reference numeral 10. The staple 10 is made entirely of a thermoplastic material and has a substantially U-shaped configuration defined by a bight 11 and a pair of legs, each designated by the same reference numeral 12, extending in substantially parallel relation from opposite ends of the bight. The legs 12 are particularly adapted to be disposed through an assembly of components which are to be stapled together with the bight on one side of the assembly. The legs 12 have outer portions each designated by same reference numeral 13 which are adapted to be disposed in clinched relation against the side of the assembly opposite the one side and as will be subsequently described; and, each of the legs 12 preferably has a sharp pointed end which is designated generally by the reference numeral 14.

Having described the staple 10 which may be used with the apparatus and method of this invention reference is now made to FIGS. 1, 3, 4 and 5 for a detailed presentation of such apparatus and method. The apparatus is best shown in FIG. 1 and designated by the reference numeral 15 and such apparatus has a stapling head 16 for carrying and serially dispensing a plurality of staples 10. The apparatus 15 has staple driving means 17 comprising the head for driving each staple through a plurality of components which are to be stapled together and once each staple is dispensed into driving position. The apparatus 15 has a clinching anvil which is designated generally by the reference numeral 20 for clinching outer portions 13 of the legs 12 of each staple 10 and as will now be described.

The head 16 is particularly adapted to carry and dispense the thermoplastic staples 10 and has suitable means within such head which support and move the staples so that the bight 11 of each staple in the exemplary apparatus 15 is disposed substantially horizontally and the parallel legs 12 are disposed substantially vertically with the legs of each staple 10 being in a common plane which is disposed perpendicular to the plane of the sheet of drawing containing FIG. 1. The means for supporting or carrying the staples in the stapling head 16 and serially dispensing same is well known in the art and designated schematically by a double arrow which is designated by the reference numeral 21 in FIG. 1.

The apparatus 15 has staple driving means 17 provided as an integral part of the head assembly and such staple driving means is used to drive each staple 10 through an assembly or workpiece to be stapled once the staple is dispensed into a driving position.

The apparatus 15 also has a clinching anvil which is designated generally by the reference numeral 20 and the anvil has a heated portion 22 which is particularly adapted to heat and shape the outer portions 13 of the legs 12 in clinched relation after disposal of the legs 12 through a plurality of components which will be referred to as an assembly of components and designated by the reference letter A in FIGS. 4 and 5. In this example of the invention the assembly A consists of a plurality of two strips or webs 23 and 24 of fabric which are to be stapled; and, the inner portions 25 of the legs 12 extend in parallel relation through the fabric layers 23 and 24 and the heated portion 22 of the anvil 20 provides the shaping action as a heat shaping action.

The initial portion of the stapling action is well known and basically consists of the outer portions 13 of the legs 12 engaging associated arcuate portions 26 of the heated portion 22 of anvil 20 and at this point the portions 13 are still sufficiently rigid to follow the contours of their associated arcuate portions whereby portions 13 are moved from vertical positions to substantially horizontal positions. As portions 13 move into the substantially horizontal positions shown in FIGS. 4 and 5, the heat from portion 22 causes immediate heat shaping thereof. The temperature of the heated portion 22 is correlated with the heat resisting properties of the particular thermoplastic material used in making each staple 10 so as to provide efficient and immediate heat shaping of portions 13.

The anvil 20 has a cooled portion 27 which is particularly adapted for cooling the outer portions 13 of the legs 12 after heat shaping thereof and the cooled portion 27 is provided adjacent the heated portion 22 and to the right thereof in the viewing of FIG. 1 The cooled portion 27 of the anvil 20 has arcuate surfaces 30 which are similar to the surfaces 26 and are particularly adapted to engage outer leg portions 13 in their heat shaped configuration of FIG. 4 to provide immediate cooling. This immediate cooling assures that the outer portions 13 are permanently clinched against the bottom surface of the fabric layer 24.

In employing the apparatus and method 15 to staple the assembly A consisting of fabric layers 23 and 24, the bight 11 of a staple 10 is disposed against the top side or surface of the assembly A and in particular against the top surface 32 of the fabric layer 23 with the legs 12 extending through the layers 23 and 24. The outer portions 13 of the legs are then permanently shaped in clinched relation against the bottom side 33 of the assembly and in particular against the bottom surface of the fabric layer 24. The permanent shaping consists of heat shaping the outer leg portions 13 utilizing the heated portion 22 of the anvil as indicated above. The heat shaping action is followed by immediate cooling using the cooled portion 27 of the anvil 20.

The stapling apparatus 15 comprises a base structure 34; and, in this example of the invention, the stapling head 16 is pivotally supported on an upper extension 35 of the base structure 34 by pivot pin 36. The apparatus 15 also has suitable means of known construction and illustrated schematically by an arrow 37 yieldingly urging the stapling head 16 and the staple driving means away from the anvil 20 and as is known in the art.

The base structure 34 of apparatus 15 has a support 40 for the anvil 20 and in this example of the invention, the support 40 has a wedge shaped configuration. Support 40 has a lower portion 41 pivotally mounted by a pivot pin 42 to a support bracket 43 carried by the base structure 34 whereby the support 40 and anvil 20 are mounted for pivoting movements.

The apparatus 15 also has means designated schematically by a double arrow 44 for pivoting the support 40 whereby the pivoting means 44 is adapted to dispose the heated portion 22 in vertical alignment with the staple driving means 17 to enable the heating and shaping of the outer portion 13 of each of the legs 12 of each staple 10 after disposal of legs 12 through the assembly A by the staple driving means 17. The pivoting means 44 is also adapted to pivot the cooled portion 27 in alignment with the staple driving means 17 and the manner in which the heated portion 22 and cooled portion 27 are disposed in precise alignment will be discussed in more detail subsequently.

The apparatus 15 is also provided with suitable means which is designated schematically and by an arrow 45 for urging the stapling head 16 against the assembly A and in particular against the bight 11 of a staple 10 after the outer portions 13 of its legs have been heat shaped and after pivoting of the cooled portion 27 with pivoting means 44 in alignment beneath the staple driving means. The urging means 45 serves to urge the heat shaped outer portions 13 of the staple legs against the cooled portion 27 of the anvil as shown in FIG. 5 to thereby cool and rigidify such outer portions 13 in clinched relation.

The apparatus 15 has a pair of stops shown as stops 46 and 47 which are suitably fixed to the base structure 34. The stop 46 is particularly adapted to stop the support 40 once the heated portion 22 is disposed in aligned relation beneath the staple driving means 17 and in particular so that the outermost or the next staple to be driven by the driving means 17 is in precise vertical alignment above the arcuate surfaces 26 of the heated portion of the anvil 20.

Similarly, the stop 47 is provided to stop the pivoting movement of the support 40 once the cooled portion 27 is disposed in precise vertical alignment beneath the staple driving means 17. However, with the cooled portion 27 in this position, it will be appreciated that the staple driving means 17 is not actuated and that instead actuator 45 is actuated to move the heat formed outer portions 13 of the legs 12 in position within arcuate surfaces to be rapidly cooled and permanently clinched.

The heated portion 22 of the anvil 20 has an integral heater disposed therein and preferably such heater in in the form of an electric heater indicated schematically and designated by the reference numeral 50. The electric heater may be any suitable type of electric heater known in the art and is provided with power from any suitable power source (not shown) in accordance with techniques known in the art.

The cooled portion 27 of the anvil 20 has an integral cooling device disposed therein and such cooling device is shown schematically as a coil and designated by the reference numeral 51. The cooling device is adapted to circulate a suitable refrigerant therethrough. The refrigerant source and means for circulating same through the coil 51 are not shown and may be of any suitable type known in the art.

The heated portion 22 of the anvil 20 and the cooled portion 27 of such anvil may be made of any suitable material. Preferably such portions are made of high strength metallic materials having high heat conductivity. The portions 22 and 27 are suitably supported within a support structure comprising the outer portion of the anvil 20 which in this example of the invention is shown as being made of a polymeric material in the form of a synthetic plastic material which is designated by the reference numeral 52. The material 52 is defined as an arcuate plate of a tough high strength material which is also a heat insulator.

The support 40 has an upper portion 53 and such upper portion is provided with suitable thermally insulating material shown in this example as a fiberglass type material. The insulating material 54 is utilized for the purpose of preventing heat from the heated portion 22 of the anvil 20 from being transferred to the cooled portion 27 of such anvil and conversely from preventing the low temperature of the cooled portion 27 from being transmitted to the heated portion 22.

The operation of the stapling apparatus 15 and method may be manual, automatic, or semiautomatic. In any event, regardless of how achieved, the preferred procedure is to dispose an assembly A of components to be stapled between the stapling head 16 and the clinching anvil 20 and in the space shown at 55 after having actuated the pivoting means 44 so as to move the support 40 against the stop 46. In this position of the support 40 the heated portion 22 of the anvil 20 is disposed beneath the staple driving means 17. The staple driving means 17 is then actuated or energized causing the outermost or end staple 10 to be driven through the assembly A causing the outer portions 13 of the legs 12 of the staple to engage the heated portion 22 whereupon such portions are heat shaped, as shown in FIG. 4. The staple driving means 17 is then released whereupon the spring means 37 in the stapling head 16 restores such head to the position illustrated in FIG. 1. The pivoting means 44 is then actuated to move the cooled portion 27 of the anvil 20 in alignment beneath the staple driving means 17 whereupon the actuator 45 is energized.

This action of energizing actuator 45 is essentially illustrated in FIG. 5 and results in the head assembly 16, i.e., a part thereof, engaging the bight 11 of the staple 10 and thereby forcing the now heat shaped outer portions 13 of legs 12 against the arcuate surfaces 30 of the cooled portion 27. A rapid cooling action takes place at this point thereby permanently clinching the outer portions 13 in position. The actuator 45 is then released enabling another assembly A to be placed in position for stapling or the same assembly may be advanced for stapling at another location. The above-described operation is then repeated.

In this disclosure of the invention reference is made to the utilization of apparatus 15 having a particular form; however, it will be appreciated that such apparatus may be modified and need not necessarily be of the form illustrated.

The staples used in practicing this invention are made entirely of thermoplastic material. It will be appreciated that the thermoplastic material employed may be any suitable material known in the art which is capable of being heat shaped in the manner described and cooled to permanently rigidify same in clinched relation, as described.

The staple driving means 17 of the apparatus 15 may be actuated by any suitable means including manual, automatic, or semiautomatic. Likewise, the urging means 45 may be manual, automatic, or semiautomatic.

It will also be appreciated that the entire apparatus 15 and assembly A to be stapled may be automated and provided with suitable moving means, actuating means, and control circuits so as to automatically and sequentially move the assembly A through the apparatus 15 while providing the required sequential operation of components 44, 17, and 45.

In this disclosure of the invention, reference has been made to top of the assembly, bottom of the assembly, vertical disposal of legs 12, horizontal disposal of bight 11, and the like. These references have been made to describe the disposal or orientation of the various items as illustrated in the drawing. However, it is to be understood that the apparatus of this invention may be disposed so as to provide a stapling action in numerous arrangements. For example, the stapling action may be achieved by turning the stapling apparatus upside down or on its side.

While present exemplary embodiments of this invention, and methods of practicing the same, have been illustrated and described, it will be recognized that this invention may be otherwise variously embodied and practiced within the scope of the following claims.

What is claimed is:

1. In a stapling apparatus for stapling an assembly of components, said apparatus having a stapling head for carrying and serially dispensing a plurality of staples made entirely of thermoplastic material, each of said staples comprising a bight and a pair of legs extending in substantially parallel relation from opposite ends of said bight, staple driving means in said head for driving each of said staples through said assembly once each staple is dispensed into a driving position, and a clinching anvil for clinching outer portions of said legs of each staple, the improvement wherein said anvil has a heated portion comprising an integral heater for heat shaping said outer portions of said legs in clinched relation after disposal of said legs through said assembly and a cooled portion comprising an integral cooling device for cooling said outer portions of said legs after shaping thereof, and said apparatus comprising a single support for said anvil and its heated and cooled portions, said support being mounted for pivoting movements about a single pivot to enable movement of said heated portion into position to provide said heat shaping of said outer portions and then movement of said cooled portion into position to provide said cooling of said outer portions.

2. In a stapling apparatus for stapling an assembly of components, said apparatus having a stapling head for carrying and serially dispensing a plurality of staples made entirely of thermoplastic material, each of said staples comprising a bight and a pair of legs extending in substantially parallel relation from opposite ends of said bight, staple driving means in said head for driving each of said staples through said assembly once each staple is dispensed into a driving position, and a clinching anvil for clinching outer portions of said legs of each staple, the improvement wherein said anvil has a heated portion comprising an integral heater for heat shaping said outer portions of said legs in clinched relation after disposal of said legs through said assembly and a cooled portion comprising an integral cooling device for cooling said outer portions of said legs after shaping thereof, and said apparatus further comprises thermal insulating means disposed around said heater and said cooling device, spring means yieldingly moving said stapling head and its staple driving means away from said anvil, a support for said anvil, said support being mounted for pivoting movement, means for pivoting said support, said pivoting means being adapted to dispose said heated portion in alignment with said staple driving means to enable said heating and shaping of said outer portions of said parallel legs after said disposal thereof through said assembly by said staple driving means, said pivoting means also being adapted to pivot said cooled portion in alignment with said staple driving means, and means for urging said stapling head against said bight after pivoting said cooled portion in said alignment with said staple driving means to thereby urge said shaped outer portions of said legs against said cooled portion to cool and rigidify same in said clinched relation.

3. An apparatus as set forth in claim 2 in which said means for urging said clamping structure comprises an actuator particularly adapted to override said spring means.

4. An apparatus as set forth in claim 2 and futher comprising a pair of stops for limiting pivoting movement of said support, one of said pair of stops stopping said support once said heated portion is in said alignment and the other of said stops stopping said support once said cooled portion is disposed in said alignment.

* * * * *